US012808427B2

(12) United States Patent
Uehara

(10) Patent No.: US 12,808,427 B2
(45) Date of Patent: Nov. 24, 2026

(54) POWER TRANSMISSION DEVICE AND TORQUE LIMITER

(71) Applicant: EXEDY Corporation, Neyagawa (JP)

(72) Inventor: Hiroshi Uehara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 19/386,486

(22) Filed: Nov. 12, 2025

(65) Prior Publication Data

US 2026/0160315 A1 Jun. 11, 2026

(30) Foreign Application Priority Data

Dec. 9, 2024 (JP) ................................ 2024-214438

(51) Int. Cl.
*F16F 15/129* (2006.01)
*F16D 7/02* (2006.01)

(52) U.S. Cl.
CPC .......... *F16F 15/1297* (2013.01); *F16D 7/025* (2013.01)

(58) Field of Classification Search
CPC .. F16F 15/129; F16F 15/1292; F16F 15/1295; F16F 15/1297; F16F 15/139; F16F 15/1392; F16F 15/1395; F16F 15/1397; F16F 15/13128; F16F 15/1202
USPC .................................... 464/68.1, 68.4, 68.41
See application file for complete search history.

(56) References Cited

U.S. PATENT DOCUMENTS 4,723,463 A * 2/1988 Reik ..................... F16F 15/139 192/213.21
4,889,218 A * 12/1989 Chasseguet ....... F16F 15/13142 464/68.4
4,972,734 A * 11/1990 Hyodo .................. F16F 15/137 192/214.1
7,467,699 B2 * 12/2008 Tsuruta ............... F16F 15/1395 464/68.4
7,934,997 B2 * 5/2011 Avins ...................... F16D 7/027 464/10
8,257,183 B2 * 9/2012 Inoshita .............. F16F 15/1297 464/68.41
8,272,966 B2 * 9/2012 Saeki .................. F16F 15/1203 464/46
8,357,050 B2 * 1/2013 Saeki .................. F16F 15/1297 464/46

(Continued)

FOREIGN PATENT DOCUMENTS

JP 2024-030506 A 3/2024

*Primary Examiner* — Jonathan P Masinick
(74) *Attorney, Agent, or Firm* — United IP Counselors, LLC

(57) ABSTRACT

A present power transmission device includes a drive plate and a torque limiter. The torque limiter includes a first side plate, an inertia member, a friction plate, a pressure plate, and an urging member. The first side plate is disposed on a first side of the drive plate in an axial direction. The first side plate is configured to be rotated unitarily with the drive plate. The inertia member is disposed on the first side of the first side plate in the axial direction. The inertia member is configured to be rotated unitarily with the first side plate. The friction plate is disposed to be rotatable relative to the first side plate. The pressure plate holds the friction plate in cooperation with the first side plate, with the friction plate interposed therebetween. The urging member urges the pressure plate toward the first side plate in the axial direction.

20 Claims, 6 Drawing Sheets

(56) References Cited

U.S. PATENT DOCUMENTS 9,784,352 B2 * 10/2017 Tomiyama ........ F16F 15/12353
10,138,978 B2 * 11/2018 Sugiyama ......... F16F 15/12353
11,428,291 B2 * 8/2022 Tomita .............. F16F 15/12373
11,619,282 B2 * 4/2023 Tomita .............. F16F 15/12373 464/68.41
11,661,971 B2 * 5/2023 Uehara ..................... F16D 3/12 464/68.1
2007/0099710 A1 * 5/2007 Yamamoto .......... F16F 15/1315 464/68.1
2010/0224459 A1 * 9/2010 Saeki ...................... F16D 7/025 192/56.1
2011/0098120 A1 * 4/2011 Nakagaito ............ F16F 15/133 464/51
2012/0064983 A1 * 3/2012 Mundt .............. F16F 15/12366 464/68.1
2012/0077604 A1 * 3/2012 Sekine .............. F16F 15/12366 464/68.4
2012/0115619 A1 * 5/2012 Takenaka .............. F16F 15/129 464/45
2013/0029771 A1 * 1/2013 Saeki .................... F16F 15/129 464/45
2014/0094321 A1 * 4/2014 Miyagawa .......... F16F 15/1297 464/46
2015/0240911 A1 * 8/2015 Uehara ............... F16F 15/1292 464/68.4
2016/0033002 A1 * 2/2016 Nakagaito ........... F16F 15/1395 464/68.4
2016/0040723 A1 * 2/2016 Nakagaito ................. F16D 3/12 464/68.1
2016/0084318 A1 * 3/2016 Nishikawa .......... F16F 15/1395 464/61.1
2016/0305489 A1 * 10/2016 Yamanaka .............. F16D 69/00
2020/0292005 A1 * 9/2020 Tomita ................ F16F 15/1236

* cited by examiner

POWER TRANSMISSION DEVICE AND TORQUE LIMITER

CROSS-REFERENCE TO RELATED APPLICATIONS

This application is based on and claims the priority benefit of Japanese application No. 2024-214438 filed on Dec. 9, 2024, the contents of which are incorporated herein by reference.

TECHNICAL FIELD

The present invention relates to a power transmission device and a torque limiter.

BACKGROUND

A power transmission device disclosed in Japan Laid-open Patent Application Publication No. 2024-030506 includes a flywheel, a torque limiter, and a damper unit. The flywheel includes an inertia ring. The torque limiter is attached to the inertia ring.

SUMMARY OF THE INVENTION

It is an object of the present invention to provide a power transmission device obtainable at a low cost.

A power transmission device according to a first aspect includes a drive plate and a torque limiter. The drive plate is configured to receive a torque outputted from a prime mover. The torque limiter is configured to be attached to the drive plate. The torque limiter includes a first side plate, an inertia member, a friction plate, a pressure plate, and an urging member. The first side plate is disposed on a first side of the drive plate in an axial direction. The first side plate is configured to be rotated unitarily with the drive plate. The inertia member is disposed on the first side of the first side plate in the axial direction. The inertia member is configured to be rotated unitarily with the first side plate. The friction plate is disposed to be rotatable relative to the first side plate. The pressure plate holds the friction plate in cooperation with the first side plate, with the friction plate interposed therebetween. The urging member urges the pressure plate toward the first side plate in the axial direction.

According to the configuration, the inertia member is disposed on the first side of the first side plate in the axial direction. In other words, the inertia member is not disposed between the drive plate and the first side plate; hence, the inertia member is disposed in a position displaced from a torque transmission path from the drive plate to the first side plate. Because of this, it is not required to rigidly fix the inertia member to the first side plate, whereby the present power transmission device is made obtainable at a lower cost than a type of power transmission device that the inertia member is disposed on the torque transmission path.

A power transmission device according to a second aspect relates to the power transmission device according to the first aspect and is configured as follows. The torque limiter includes a second side plate. The second side plate is disposed on the first side of the first side plate in the axial direction. The friction plate, the pressure plate, and the urging member are disposed axially between the first and second side plates. The inertia member is held by the first and second side plates, with being axially interposed therebetween.

A power transmission device according to a third aspect relates to the power transmission device according to the first or second aspect and is configured as follows. The first side plate includes an annular portion and a cylindrical portion. The annular portion extends in a circumferential direction. The cylindrical portion extends from an outer peripheral end of the annular portion to the first side in the axial direction. The inertia member is disposed to overlap with the cylindrical portion as seen in a radial direction. The inertia member is disposed to overlap with the annular portion as seen in the axial direction.

A power transmission device according to a fourth aspect relates to the power transmission device according to the third aspect and is configured as follows. The torque limiter includes a second side plate. The second side plate is disposed on the first side of the first side plate in the axial direction. The second side plate includes an outer peripheral surface in contact with an inner peripheral surface of the cylindrical portion.

A power transmission device according to a fifth aspect relates to the power transmission device according to the fourth aspect and is configured as follows. The outer peripheral surface of the second side plate includes a contact portion and a non-contact portion. The contact portion extends in a circular-arc shape as seen in the axial direction. The contact portion is in contact with the inner peripheral surface of the cylindrical portion. The non-contact portion extends straight as seen in the axial direction. The non-contact portion is not in contact with the inner peripheral surface of the cylindrical portion.

A power transmission device according to a sixth aspect relates to the power transmission device according to any of the first to fifth aspects and is configured as follows. The first side plate includes a first bulging portion. The first bulging portion bulges to the first side in the axial direction. The inertia member is disposed radially outside the first bulging portion.

A power transmission device according to a seventh aspect relates to the power transmission device according to the sixth aspect and is configured as follows. The torque limiter includes a second side plate. The second side plate is disposed on the first side of the first side plate in the axial direction. The second side plate includes a second bulging portion. The second bulging portion bulges to a second side in the axial direction. The second bulging portion is in contact with the first bulging portion in the axial direction. The inertia member is disposed radially outside the first and second bulging portions.

A power transmission device according to an eighth aspect relates to the power transmission device according to any of the first to seventh aspects and is configured as follows. The inertia member includes a screw hole extending in the axial direction.

A power transmission device according to a ninth aspect relates to the power transmission device according to any of the first to eighth aspects and is configured as follows. The inertia member is made in shape of an annulus extending in a circumferential direction. The inertia member is larger in plate thickness than the first side plate.

A power transmission device according to a tenth aspect relates to the power transmission device according to any of the first to ninth aspects and is configured as follows. The inertia member is a nut with a thickness larger than a plate thickness of the first side plate.

A power transmission device according to an eleventh aspect relates to the power transmission device according to any of the first to tenth aspects and further includes a damper unit. The damper unit includes a first rotary member, a second rotary member, and an elastic member. The first rotary member is configured to be rotated unitarily with the friction plate. The second rotary member is disposed to be rotatable relative to the first rotary member. The elastic member elastically couples the first and second rotary members therethrough to each other.

A torque limiter according to a twelfth aspect is configured to be attached to a drive plate that is configured to receive a torque outputted from a prime mover. The torque limiter includes a first side plate, an inertia member, a friction plate, a pressure plate, and an urging member. The first side plate is disposed on a first side of the drive plate in an axial direction. The first side plate is configured to be rotated unitarily with the drive plate. The inertia member is disposed on the first side of the first side plate in the axial direction. The inertia member is configured to be rotated unitarily with the first side plate. The friction plate is disposed to be rotatable relative to the first side plate. The pressure plate holds the friction plate in cooperation with the first side plate, with the friction plate interposed therebetween. The urging member urges the pressure plate toward the first side plate in the axial direction.

Overall, according to the present invention, it is made possible to provide a power transmission device obtainable at a low cost.

DETAILED DESCRIPTION

A torque limiter 3 and a power transmission device 100 according to the present preferred embodiment will be hereinafter explained with reference to drawings. It should be noted that in the following explanation, the term "axial direction" refers to an extending direction of a rotational axis O for both the torque limiter 3 and the power transmission device 100. On the other hand, the term "circumferential direction" refers to a circumferential direction of an imaginary circle about the rotational axis O, whereas the term "radial direction" refers to a radial direction of the imaginary circle about the rotational axis O. In addition, the term "first side in the axial direction" means the right side in FIG. 2, whereas the term "second side in the axial direction" means the left side in FIG. 2.

Figure 1:
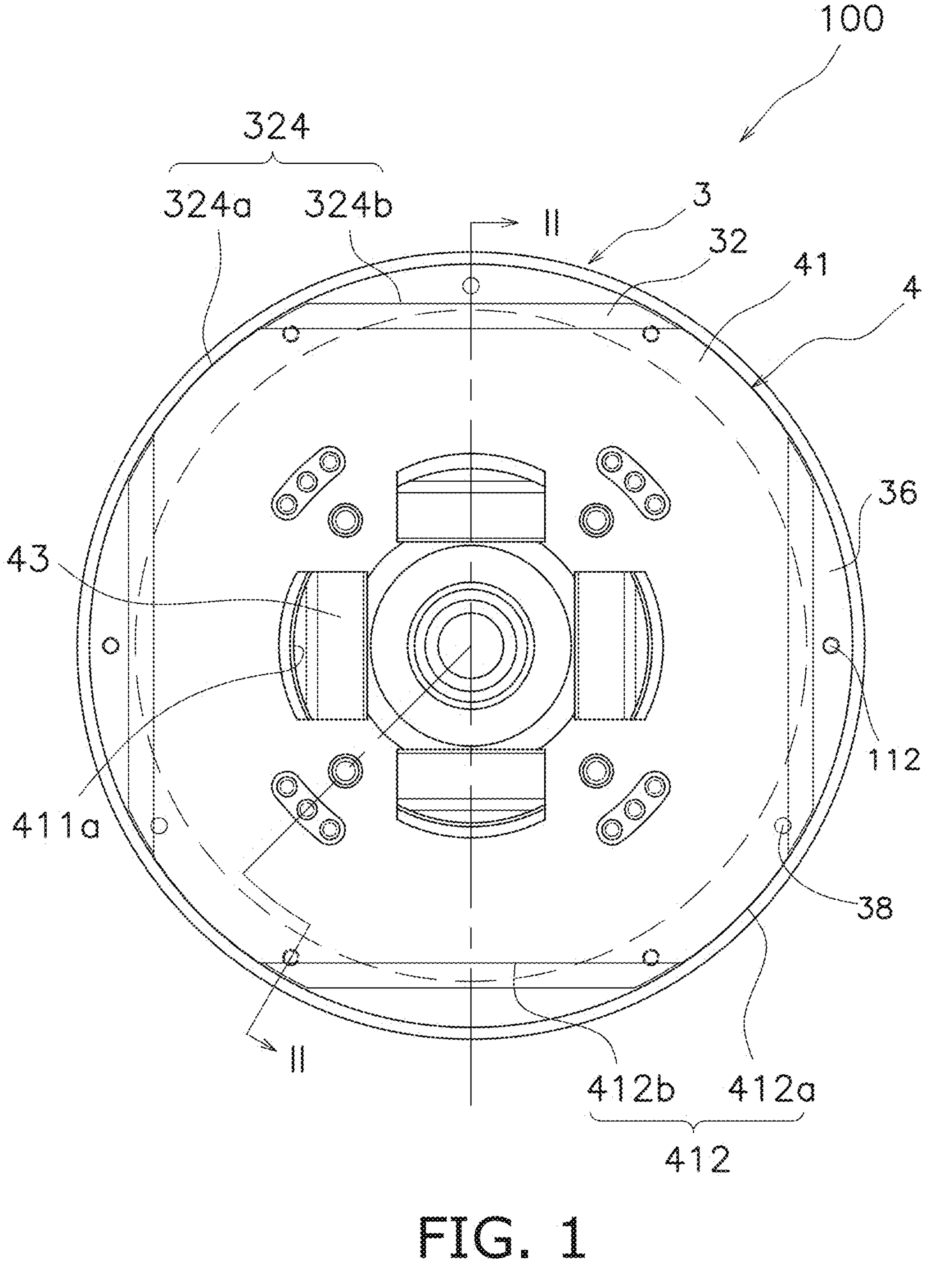
FIG. 1 is a front view of a power transmission device.
Figure 2:
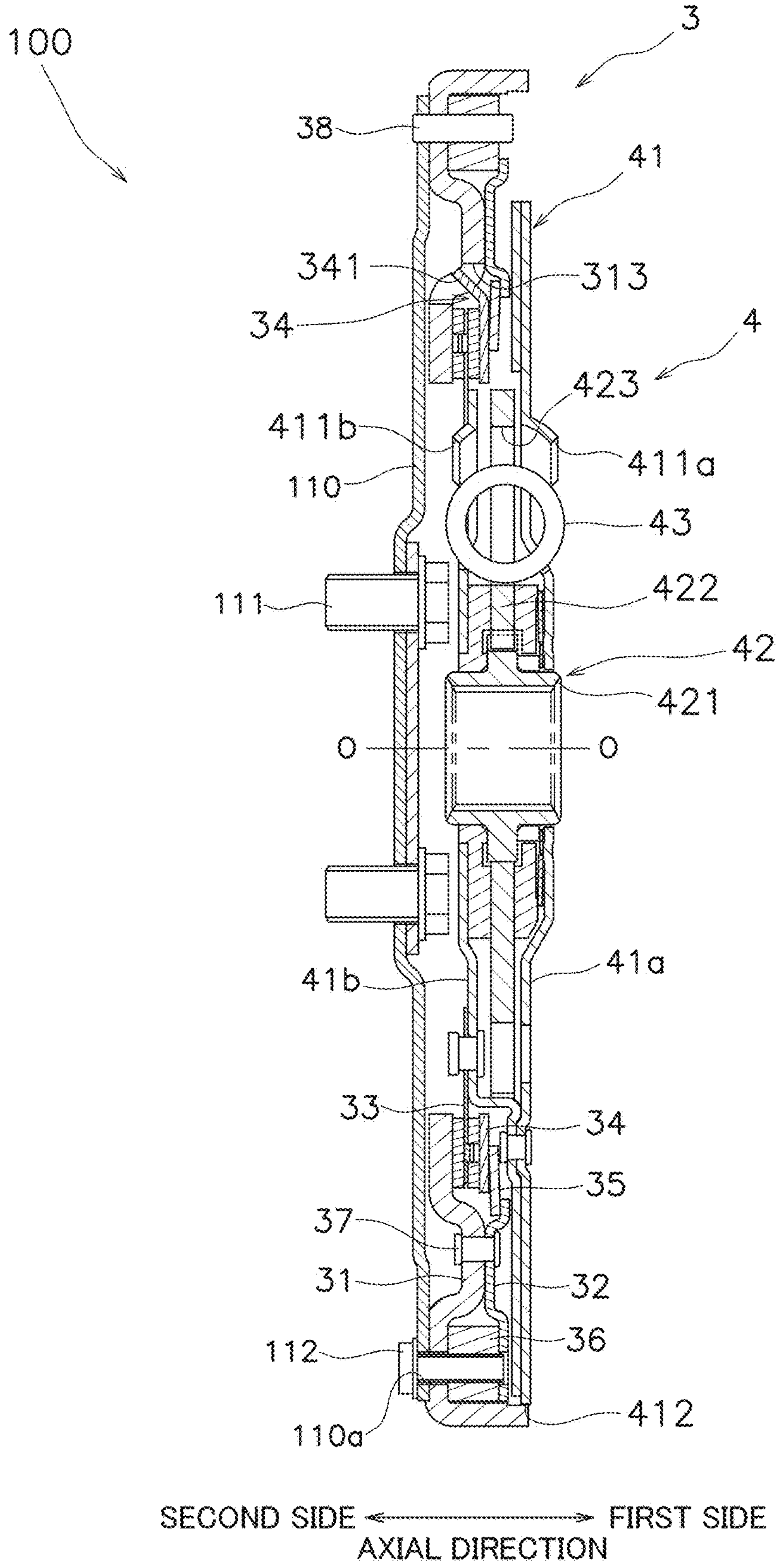
FIG. 2 is a cross-sectional view of the power transmission device taken along line II-II in FIG. 1.

FIG. 1 is a front view of the power transmission device 100, whereas FIG. 2 is a cross-sectional view of the power transmission device 100 taken along line II-II in FIG. 1. As shown in FIGS. 1 and 2, the power transmission device 100 includes a drive plate 110, the torque limiter 3, and a damper unit 4. The drive plate 110 and the torque limiter 3 are configured to be rotated unitarily with each other. The torque limiter 3 and the damper unit 4, albeit rotatable relative to each other, are basically rotated unitarily with each other. When a torque transmitted to the power transmission device 100 exceeds a predetermined value, the torque limiter 3 and the damper unit 4 are rotated relative to each other.

The power transmission device 100 is installed between a prime mover (omitted in illustration) and an output-side member (omitted in illustration). It should be noted that the prime mover refers to, for instance, an internal combustion engine. On the other hand, the output-side member refers to, for instance, an electric motor, a transmission, or so forth. The internal combustion engine is disposed on the second side (the left side in FIG. 2) of the power transmission device 100 in the axial direction, whereas the output-side member is disposed on the first side (the right side in FIG. 2) of the power transmission device 100 in the axial direction. The power transmission device 100 is configured to limit a torque transmitted between the internal combustion engine and the output-side member and attenuate fluctuations in torque.

Drive Plate

The drive plate 110 is configured to receive a torque outputted from the prime mover. Specifically, the drive plate 110 is attached to, for instance, a crankshaft (omitted in illustration) by a plurality of bolts 111. The drive plate 110 includes a plurality of through holes 110*a*. The through holes 110*a* are disposed at intervals in the circumferential direction. The drive plate 110 has a disc shape.

Damper Unit

The damper unit 4 is attached to the torque limiter 3. The damper unit 4 is configured to attenuate fluctuations in rotation. The damper unit 4 includes a first rotary member 41, a second rotary member 42, and a plurality of elastic members 43.

First Rotary Member

The first rotary member 41 is rotated unitarily with a friction plate 33 of the torque limiter 3 (to be described). The first rotary member 41 includes a first plate 41*a* and a second plate 41*b*. Each of the first and second plates 41*a* and 41*b* is an annular member including a center hole. The first and second plates 41*a* and 41*b* are rotated unitarily with each other. In addition, the first and second plates 41*a* and 41*b* are axially immovable relative to each other.

The first and second plates 41*a* and 41*b* are disposed away from each other at an interval in the axial direction. The second plate 41*b* is disposed on the second side of the first plate 41*a* in the axial direction.

The first plate 41*a* includes a plurality of window portions 411*a*, while the second plate 41*b* includes a plurality of window portions 411*b*. It should be noted that in the present preferred embodiment, the first plate 41*a* includes four window portions 411*a*, while the second plate 41*b* includes four window portions 411*b*; however, the window portions 411*a*, 411*b* are not limited in number to this.

Not only the window portions 411*a* but also the window portions 411*b* are disposed away from each other at intervals in the circumferential direction. Not only the window portions 411*a* but also the window portions 411*b* are configured to accommodate the elastic members 43, respectively.

The first rotary member 41 is in contact at an outer peripheral surface 412 thereof with the inner peripheral surface of a cylindrical portion 312 (to be described). It should be noted that the outer peripheral surface 412 of the first rotary member 41 is composed of at least one of the outer peripheral surfaces of the first and second plates 41*a* and 41*b*. The outer peripheral surface 412 of the first rotary member 41 includes a plurality of contact portions 412*a* and a plurality of non-contact portions 412*b*. It should be noted that in the present preferred embodiment, the outer peripheral surface 412 of the first rotary member 41 includes four contact portions 412*a* and four non-contact portions 412*b*.

Each contact portion 412*a* extends in a circular-arc shape as seen in the axial direction. Each contact portion 412*a* is in contact with the inner peripheral surface of the cylindrical portion 312. Each non-contact portion 412*b* extends straight as seen in the axial direction. Each non-contact portion 412*b* is not in contact with the inner peripheral surface of the cylindrical portion 312.

The outer peripheral edge of the first rotary member 41 is disposed radially outside that of the friction plate 33. The first rotary member 41 overlaps at an outer peripheral part thereof with a plurality of fastening members 37 (to be described) as seen in the axial direction. In addition, the first rotary member 41 overlaps at the outer peripheral part thereof with an inertia member 36 (to be described) as seen in the axial direction. The outer peripheral part of the first rotary member 41 is disposed on the first side of the torque limiter 3 in the axial direction.

Second Rotary Member

The second rotary member 42 is configured to transmit the torque, inputted thereto from the first rotary member 41, to the output-side member. The second rotary member 42 is disposed axially between the first and second plates 41*a* and 41*b*. The second rotary member 42 is disposed to be rotatable relative to the first and second plates 41*a* and 41*b*.

The second rotary member 42 includes a hub 421 and a flange plate 422. The hub 421 and the flange plate 422 are separated as different members but may be integrated as a single member.

The hub 421 has a tubular shape and extends in the axial direction. The hub 421 is disposed in the center hole of the first plate 41*a* and that of the second plate 41*b*. The hub 421 is provided with a spline hole, extending in the axial direction, in an inner peripheral part thereof. The spline hole enables an input shaft of the output-side member to be spline-coupled thereto.

The flange plate 422 radially extends from the outer peripheral surface of the hub 421. The flange plate 422 has an annular shape. The flange plate 422 is disposed to be rotatable relative to the first and second plates 41*a* and 41*b*. The flange plate 422 is disposed axially between the first and second plates 41*a* and 41*b*.

The flange plate 422 includes a plurality of accommodation holes 423. It should be noted that in the present preferred embodiment, the flange plate 422 includes four accommodation holes 423; however, the accommodation holes 423 are not limited in number to this. The accommodation holes 423 are disposed away from each other at intervals in the circumferential direction. The accommodation holes 423 are configured to accommodate the elastic members 43, respectively. The accommodation holes 423 are disposed to overlap with not only the window portions 411*a* but also the window portions 411*b*, respectively, as seen in the axial direction.

Elastic Members

The elastic members 43 are configured to elastically couple the first and second rotary members 41 and 42 therethrough to each other in a rotational direction. The elastic members 43 are, for instance, coil springs.

The elastic members 43 are accommodated in the accommodation holes 423 of the second rotary member 42, respectively. In addition, the elastic members 43 are accommodated in not only the window portions 411*a* of the first plate 41*a* but also the window portions 411*b* of the second plate 41*b*, respectively.

Torque Limiter

The torque limiter 3 is disposed to be rotatable about the rotational axis O. The torque limiter 3 is disposed on the first side of the drive plate 110 in the axial direction. The torque limiter 3 has an annular shape. The torque limiter 3 is configured to be attached to the drive plate 110.

The torque limiter 3 is configured to limit the torque transmitted between the drive plate 110 and the damper unit 4. In other words, the torque limiter 3 is configured to restrict transmission of the torque in the power transmission device 100 when the torque is greater than or equal to the predetermined value.

The torque limiter 3 includes a first side plate 31, a second side plate 32, the friction plate 33, a pressure plate 34, an urging member 35, and the inertia member 36.

First Side Plate

The first side plate 31 is disposed on the first side of the drive plate 110 in the axial direction. The first side plate 31 is attached to the drive plate 110. Specifically, the first side plate 31 includes a plurality of through holes 310. The through holes 310 are disposed at intervals in the circumferential direction. Each through hole 310 opens to the second side in the axial direction. The through holes 310 are disposed to communicate with the through holes 110*a* of the drive plate 110 in a one-to-one correspondence.

A plurality of bolts 112 fasten the drive plate 110, the first side plate 31, and the inertia member 36 therethrough to each other. The bolts 112 penetrate not only the through holes 110*a* of the drive plate 110 but also the through holes 310 of the first side plate 31, respectively. The first side plate 31 is rotated unitarily with the drive plate 110. The first side plate 31 has an annular shape. The first side plate 31 is larger in plate thickness than the drive plate 110.

Figure 3:
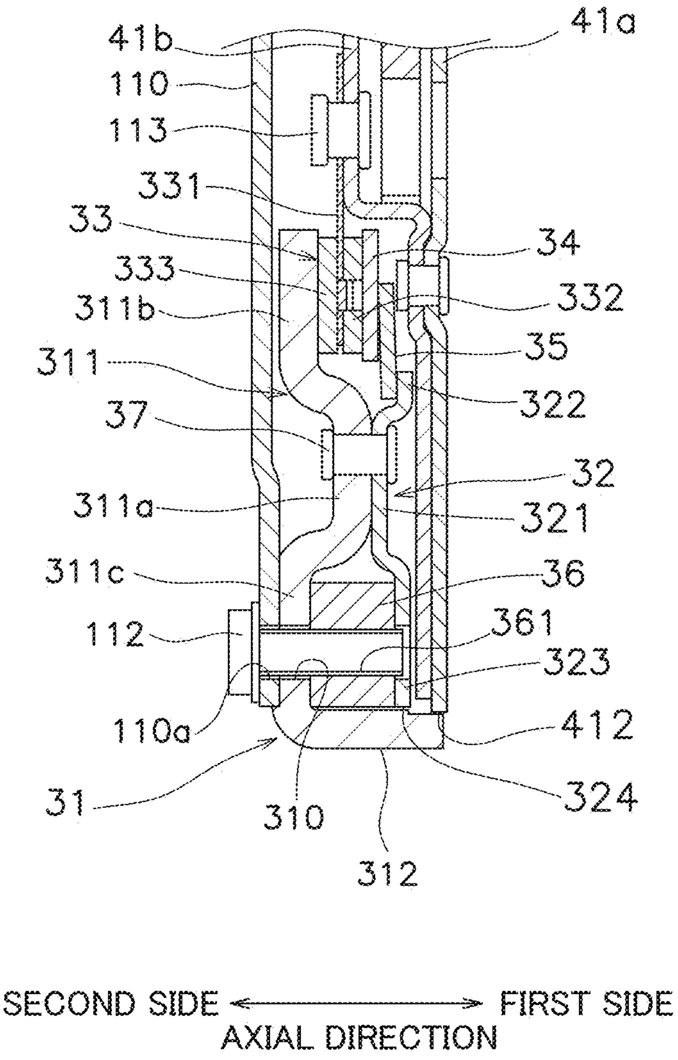
FIG. 3 is an enlarged cross-sectional view of the power transmission device.

FIG. 3 is an enlarged cross-sectional view of the power transmission device 100. As shown in FIG. 3, the first side plate 31 includes an annular portion 311 and the cylindrical portion 312. The annular portion 311 and the cylindrical portion 312 are integrated as a single member.

The annular portion 311 is made in the shape of an annulus extending in the circumferential direction. The annular portion 311 includes a first bulging portion 311*a*, a first inner peripheral portion 311*b*, and a first outer peripheral portion 311*c*. The first bulging portion 311*a* bulges in the axial direction. The first bulging portion 311*a* bulges to a side identical to extension of the cylindrical portion 312. In other words, the first bulging portion 311*a* bulges to the first side in the axial direction. The first bulging portion 311*a* bulges further to the first side in the axial direction than the other part of the annular portion 311. The first bulging portion 311*a* extends in the circumferential direction.

The first inner peripheral portion 311*b* is disposed radially inside the first bulging portion 311*a*. The first inner peripheral portion 311*b* is in contact with the friction plate 33.

The first outer peripheral portion 311*c* is disposed radially outside the first bulging portion 311*a*. The first outer peripheral portion 311*c* is in contact with the inertia member 36. In addition, the first outer peripheral portion 311*c* is in contact with the drive plate 110. In other words, the first outer peripheral portion 311*c* is sandwiched between the drive plate 110 and the inertia member 36.

The cylindrical portion 312 extends from the outer peripheral end of the annular portion 311 in the axial direction. When described in detail, the cylindrical portion 312 extends from the outer peripheral end of the annular portion 311 to the first side in the axial direction. In other words, the cylindrical portion 312 extends from the outer peripheral end of the annular portion 311 in the axial direction so as to separate from the drive plate 110. It should be noted that the cylindrical portion 312 can be formed by bending an outer peripheral part of the first side plate 31 in the axial direction. The first side plate 31 can be formed by sheet metal processing or stamping.

Second Side Plate

The second side plate 32 is disposed on the first side of the first side plate 31 in the axial direction. The friction plate 33, the pressure plate 34, and the urging member 35 are disposed axially between the first and second side plates 31 and 32. The second side plate 32 is smaller in plate thickness than the first side plate 31.

The second side plate 32 is configured to be rotated unitarily with the first side plate 31. The second side plate 32 is fastened to the first side plate 31 by the plural fastening members 37. The fastening members 37 are disposed at intervals in the circumferential direction. The fastening members 37 are, for instance, rivets.

The second side plate 32 includes a second bulging portion 321, a second inner peripheral portion 322, and a second outer peripheral portion 323. The second bulging portion 321 bulges in the axial direction. The second bulging portion 321 bulges to a side opposite to bulging of the first bulging portion 311*a*. Specifically, the second bulging portion 321 bulges to the second side in the axial direction. In other words, the second bulging portion 321 bulges toward the first bulging portion 311*a*.

The second bulging portion 321 extends in the circumferential direction. The second bulging portion 321 is in contact with the first bulging portion 311*a* in the axial direction. The fastening members 37 fasten the first and second bulging portions 311*a* and 321 therethrough to each other.

The second inner peripheral portion 322 is disposed radially inside the second bulging portion 321. The second inner peripheral portion 322 supports the urging member 35. The second inner peripheral portion 322 is disposed away from the first inner peripheral portion 311*b* at an interval in the axial direction. The friction plate 33, the pressure plate 34, and the urging member 35 are disposed axially between the first and second inner peripheral portions 311*b* and 322.

The second outer peripheral portion 323 is disposed radially outside the second bulging portion 321. The second outer peripheral portion 323 is disposed away from the first outer peripheral portion 311*c* at an interval in the axial direction. The inertia member 36 is disposed axially between the first and second outer peripheral portions 311*c* and 323. The second outer peripheral portion 323 is in contact with the inertia member 36.

The second side plate 32 is in contact at an outer peripheral surface 324 with the inner peripheral surface of the cylindrical portion 312. As shown in FIG. 1, the outer peripheral surface 324 of the second side plate 32 includes a plurality of contact portions 324*a* and a plurality of non-contact portions 324*b*. It should be noted that in the present preferred embodiment, the outer peripheral surface 324 of the second side plate 32 include four contact portions 324*a* and four non-contact portions 324*b*.

Each contact portion 324*a* extends in a circular-arc shape as seen in the axial direction. Each contact portion 324*a* is in contact with the inner peripheral surface of the cylindrical portion 312. Each non-contact portion 324*b* extends straight as seen in the axial direction. Each non-contact portion 324*b* is not in contact with the inner peripheral surface of the cylindrical portion 312.

Friction Plate

As shown in FIGS. 2 and 3, the friction plate 33 is a plate made in the shape of an annulus extending in the circumferential direction. The friction plate 33 is disposed to be rotatable about the rotational axis O. The friction plate 33 is disposed to be rotatable relative to the first side plate 31.

The friction plate 33 is in contact with the first side plate 31 in the axial direction. When described in detail, the friction plate 33 is in contact with the first inner peripheral portion 311*b* of the annular portion 311 in the axial direction. The friction plate 33 is configured to be engaged by friction with the first side plate 31.

The friction plate 33 is attached to the first rotary member 41. When described in detail, the friction plate 33 is attached to the second plate 41*b*. For example, the friction plate 33 is attached to the second plate 41*b* by one or more fastening members 113. The friction plate 33 is rotated unitarily with the first rotary member 41. It should be noted that the friction plate 33 is provided as a discrete member separated from the second plate 41*b*; alternatively, the friction plate 33 may be integrated with the second plate 41*b* as a single member.

The friction plate 33 includes a plate body 331, a first friction material 332, and a second friction material 333. The plate body 331 is made in the shape of an annulus extending in the circumferential direction. The first friction material 332 is attached to the axially first side one of the surfaces of the plate body 331. The second friction material 333 is attached to the axially second side one of the surfaces of the plate body 331. The first and second friction materials 332 and 333 are rotated unitarily with the plate body 331. Each of the first and second friction materials 332 and 333 has an annular shape. The first and second friction materials 332 and 333 are attached to an outer peripheral part of the plate body 331.

Pressure Plate

The pressure plate 34 has an annular shape. The pressure plate 34 is disposed axially between the urging member 35 and the friction plate 33. The pressure plate 34 holds the friction plate 33 in cooperation with the first side plate 31, with the friction plate 33 interposed therebetween. The pressure plate 34 is in contact with the first friction material 332, while the first side plate 31 is in contact with the second friction material 333.

The pressure plate 34 is configured to be rotated unitarily with the first side plate 31. It should be noted that the pressure plate 34 is axially movable with respect to the first side plate 31. Specifically, the pressure plate 34 includes a plurality of protruding portions 341 protruding radially outward (see FIG. 2). The protruding portions 341 are engaged with a plurality of engaging holes 313 provided in the first side plate 31, respectively, whereby the pressure plate 34 is rotated unitarily with the first side plate 31, while being axially movable with respect thereto.

Urging Member

The urging member 35 is disposed axially between the second side plate 32 and the pressure plate 34. The urging member 35 urges the pressure plate 34 to the second side in the axial direction. In other words, the urging member 35 urges the pressure plate 34 toward the first side plate 31. Accordingly, the friction plate 33 is held by the pressure plate 34 and the first side plate 31, while being interposed therebetween. The urging member 35 is made in the shape of an annulus extending in the circumferential direction. The urging member 35 is, for instance, a disc spring. The urging member 35 is in contact at the outer peripheral end thereof with the second inner peripheral portion 322, while being in contact at the inner peripheral end thereof with the pressure plate 34.

Inertia Member

The inertia member 36 is made in the shape of an annulus extending in the circumferential direction. The inertia member 36 is larger in plate thickness than the first side plate 31. It should be noted that the plate thickness of the inertia member 36 means the axial dimension thereof. The inertia member 36 is disposed on the first side of the first side plate 31 in the axial direction. The inertia member 36 includes a plurality of screw holes 361. Each screw hole 361 opens to the second side in the axial direction. It should be noted that in the present preferred embodiment, each screw hole 361 penetrates the inertia member 36 in the axial direction; hence, each screw hole 361 opens to the first side in the axial direction as well. The screw holes 361 are communicated with the through holes 310 on a one-to-one correspondence. The bolts 112 are screwed into the screw holes 361 of the inertia member 36, respectively. Accordingly, the torque limiter 3 is attached to the drive plate 110.

The inertia member 36 is configured to be rotated unitarily with the first side plate 31. Specifically, the inertia member 36 is attached to the first side plate 31 by a plurality of pins 38. In addition, the inertia member 36 is attached to the first side plate 31 by the plural bolts 112 as well.

The inertia member 36 overlaps with the cylindrical portion 312 as seen in the radial direction. When described in detail, the outer peripheral surface of the inertia member 36 is opposed to the inner peripheral surface of the cylindrical portion 312. The inertia member 36 overlaps with the annular portion 311 as seen in the axial direction. When described in detail, the inertia member 36 overlaps with the first outer peripheral portion 311*c* as seen in the axial direction. The inertia member 36 is opposed to the annular portion 311. It should be noted that another member may be interposed between the inertia member 36 and the annular portion 311.

The inertia member 36 overlaps with the second side plate 32 as seen in the axial direction. When described in detail, the inertia member 36 overlaps with the second outer peripheral portion 323 as seen in the axial direction. The inertia member 36 is opposed to the second outer peripheral portion 323. It should be noted that another member may be interposed between the inertia member 36 and the second outer peripheral portion 323.

The inertia member 36 is sandwiched by the annular portion 311 of the first side plate 31 and the second side plate 32 in the axial direction. When described in detail, the inertia member 36 is sandwiched by the first outer peripheral portion 311*c* and the second outer peripheral portion 323 in the axial direction.

The inertia member 36 is disposed radially outside the first bulging portion 311*a*. The inertia member 36 is disposed radially outside the second bulging portion 321. The inertia member 36 is disposed radially between the cylindrical portion 312 and the first bulging portion 311*a*. Also, the inertia member 36 is disposed radially between the cylindrical portion 312 and the second bulging portion 321. Thus, the inertia member 36 is disposed in a space defined by the cylindrical portion 312, the first outer peripheral portion 311*c*, the first bulging portion 311*a*, the second outer peripheral portion 323, and the second bulging portion 321.

Modifications

One preferred embodiment of the present invention has been explained above. However, the present invention is not limited to the above, and it will be apparent to one of ordinary skill in the art from this disclosure that a variety of changes can be made without departing from the gist of the present invention. It should be noted that basically speaking, respective modifications to be described are applicable separately or in combination in an embodiment.

Figure 4:
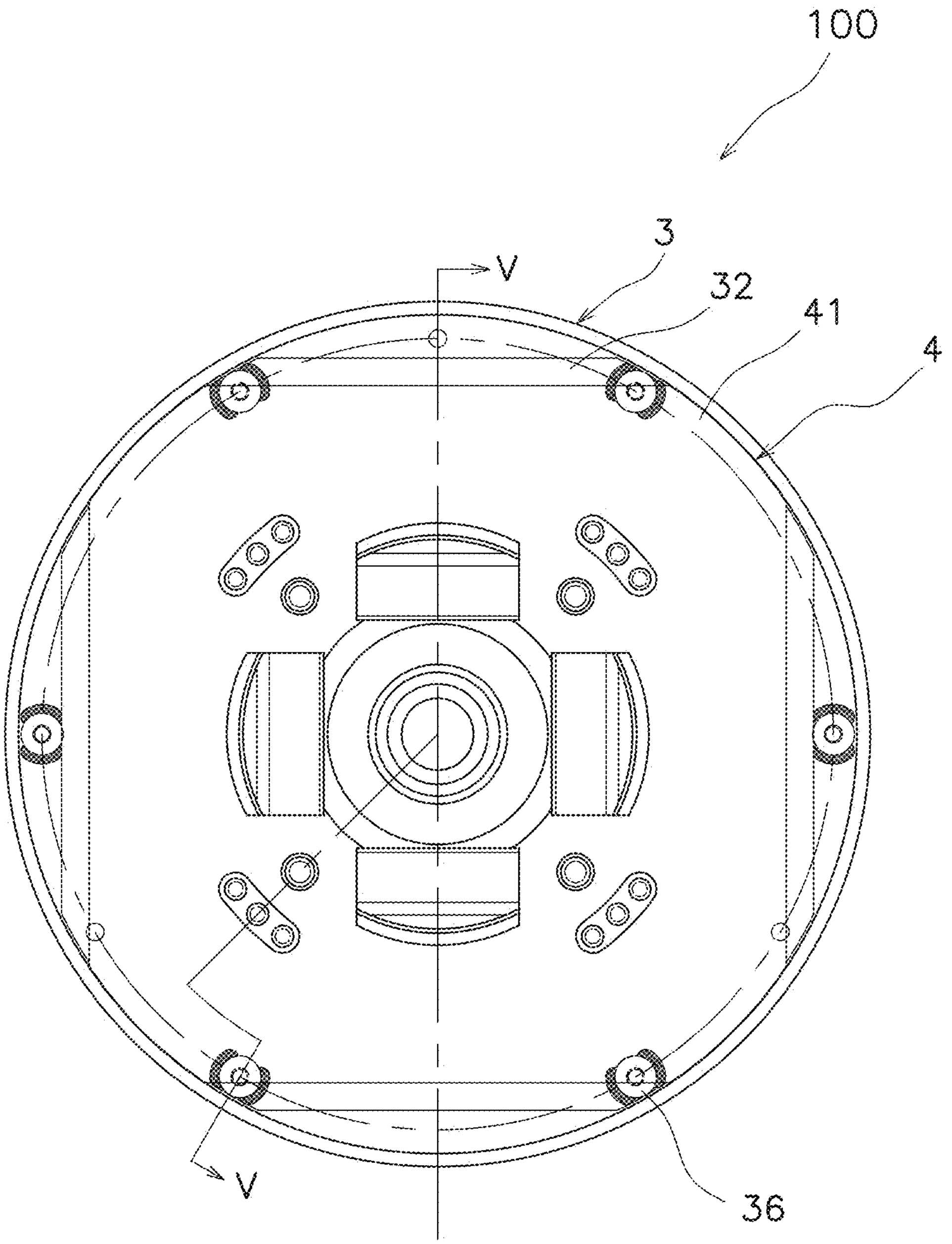
FIG. 4 is a front view of a power transmission device according to a modification.
Figure 5:
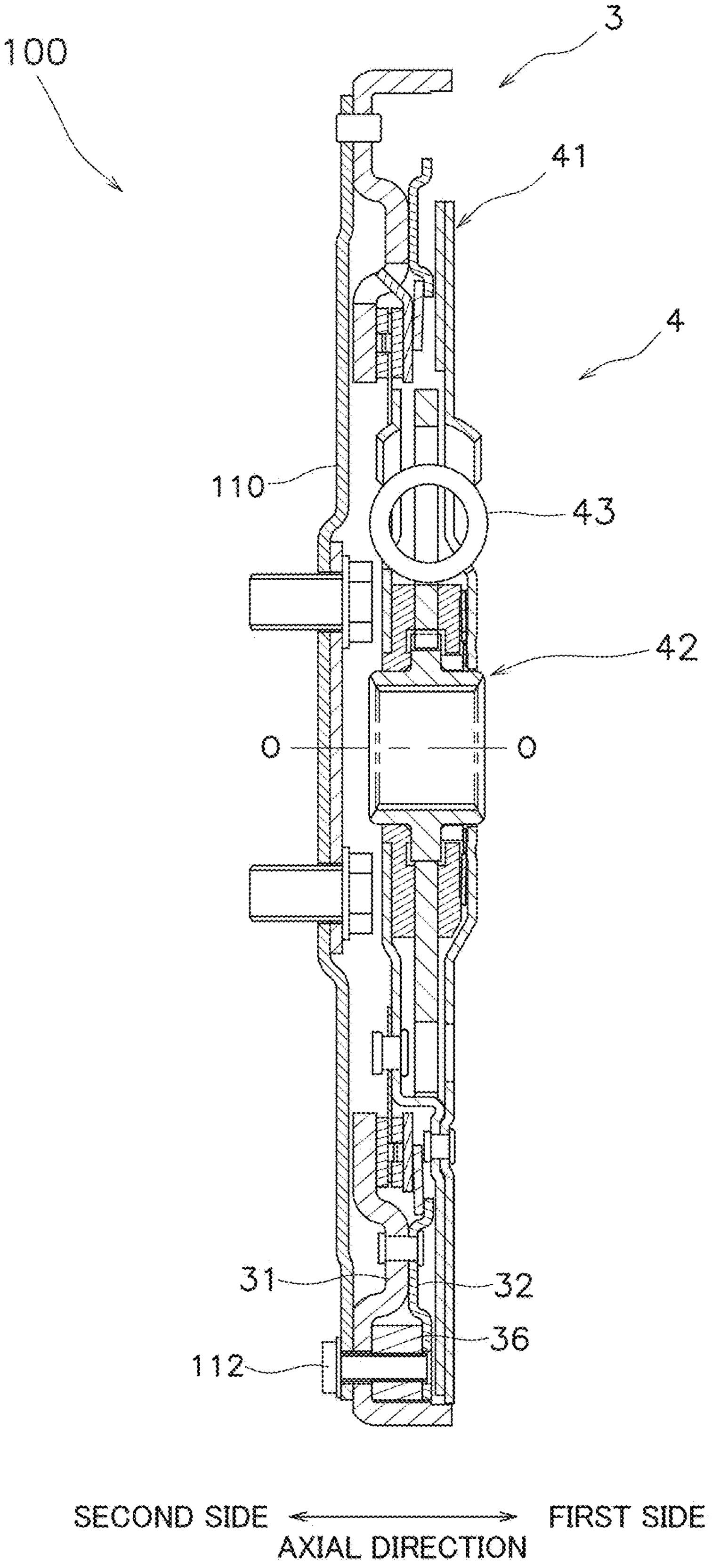
FIG. 5 is a cross-sectional view of the power transmission device taken along line V-V in FIG. 4.

(a) The inertia member 36 may not be made in the shape of an annulus. For example, as shown in FIGS. 4 and 5, the inertia member 36 may be composed of a plurality of nuts 36. The nuts 36 are disposed at intervals in the circumferential direction. The nuts 36 can be fixed to the first side plate 31 by welding or so forth. Each nut 36 has a thickness larger than the plate thickness of the first side plate 31. It should be noted that FIG. 4 is a front view of a power transmission device in the present modification, whereas FIG. 5 is a cross-sectional view of the power transmission device taken along line V-V in FIG. 4.

Figure 6:
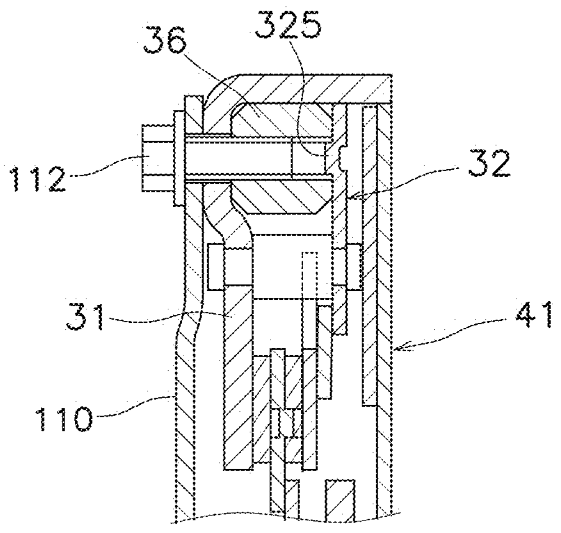
FIG. 6 is a cross-sectional view of the power transmission device according to a variation of the modification.

As shown in FIG. 6, in the present modification, the second side plate 32 may include a plurality of protrusions 325. The protrusions 325 protrude to the second side in the axial direction. The protrusions 325 are engaged with screw holes of the nuts 36 on a one-to-one correspondence. Accordingly, the nuts 36, sandwiched by the first and second side plates 31 and 32, can be prevented from moving in the circumferential direction and/or so forth before the torque limiter 3 is attached to the drive plate 110 by the bolts 112. Thus, the nuts 36 can be prevented from moving without being welded to the first side plate 31.

(b) The first side plate 31 may not include the cylindrical portion 312.

LIST OF REFERENCE NUMERALS

3: Torque limiter, 31: First side plate, 311: Annular portion, 311*a*: First bulging portion, 312: Cylindrical portion, 32: Second side plate, 321: Second bulging portion, 324: Outer peripheral surface, 324*a*: Contact portion, 324*b*: Non-contact portion, 33: Friction plate, 34: Pressure plate, 35: Urging member, 36: Inertia member, 361: Screw hole, 4: Damper unit, 41: First rotary member, 42: Second rotary member, 43: Elastic member, 100: Power transmission device, 110: Drive plate.

The term “comprising” and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms “have,” “include” and their derivatives.

The terms “member,” “section,” “portion,” “part,” “element,” “body” and “structure” when used in the singular can have the dual meaning of a single part or a plurality of parts.

The ordinal numbers such as “first” and “second” recited in the present application are merely identifiers, but do not have any other meanings, for example, a particular order and the like. Moreover, for example, the term “first element” itself does not imply an existence of “second element,” and the term “second element” itself does not imply an existence of “first element.”

The term “plurality,” as used herein, can encompass the configuration in which each element of a plurality of elements has a different shape or structure from each other in addition to the configuration in which the plurality of elements have the same shapes or structures as each other.

The terms “a” (or “an”), “one or more” and “at least one” can be used interchangeably herein. The phrase “at least one of” as used in this disclosure means “one or more” of a desired choice.

Terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Modifications and variations of the present invention will be apparent to one of ordinary skill in the art in light of this disclosure. It is therefore to be understood that within the scope of the appended claims, the invention may be practiced otherwise than as specifically described herein.

The invention claimed is:

1. A power transmission device comprising:

a drive plate configured to receive a torque outputted from a prime mover; and a torque limiter configured to be attached to the drive plate, the torque limiter including a first side plate disposed on a first side of the drive plate in an axial direction, the first side plate configured to be rotated unitarily with the drive plate, an inertia member disposed on the first side of the first side plate in the axial direction, the inertia member configured to be rotated unitarily with the first side plate, a friction plate disposed to be rotatable relative to the first side plate, a pressure plate holding the friction plate in cooperation with the first side plate, with the friction plate interposed therebetween, and an urging member urging the pressure plate toward the first side plate in the axial direction.

2. The power transmission device according to claim 1, wherein the torque limiter includes a second side plate disposed on the first side of the first side plate in the axial direction, the friction plate, the pressure plate, and the urging member are disposed axially between the first and second side plates, and the inertia member is held by the first and second side plates with being axially interposed therebetween.

3. The power transmission device according to claim 2, wherein the first side plate includes an annular portion extending in a circumferential direction, and a cylindrical portion extending from an outer peripheral end of the annular portion to the first side in the axial direction, and the inertia member is disposed to overlap with the cylindrical portion as seen in a radial direction, the inertia member disposed to overlap with the annular portion as seen in the axial direction.

4. The power transmission device according to claim 2, wherein the first side plate includes a first bulging portion bulging to the first side in the axial direction, and the inertia member is disposed radially outside the first bulging portion.

5. The power transmission device according to claim 2, wherein the inertia member includes a screw hole extending in the axial direction.

6. The power transmission device according to claim 2, wherein the inertia member is made in a shape of an annulus extending in a circumferential direction, and the inertia member is larger in plate thickness than the first side plate.

7. The power transmission device according to claim 2, wherein the inertia member is a nut with a thickness larger than a plate thickness of the first side plate.

8. The power transmission device according to claim 2, further comprising:

a damper unit, wherein the damper unit includes a first rotary member configured to be rotated unitarily with the friction plate, a second rotary member disposed to be rotatable relative to the first rotary member, and an elastic member elastically coupling the first and second rotary members therethrough to each other.

9. The power transmission device according to claim 1, wherein the first side plate includes an annular portion extending in a circumferential direction, and a cylindrical portion extending from an outer peripheral end of the annular portion to the first side in the axial direction, and the inertia member is disposed to overlap with the cylindrical portion as seen in a radial direction, the inertia member disposed to overlap with the annular portion as seen in the axial direction.

10. The power transmission device according to claim 9, wherein the torque limiter includes a second side plate disposed on the first side of the first side plate in the axial direction, and the second side plate includes an outer peripheral surface in contact with an inner peripheral surface of the cylindrical portion.

11. The power transmission device according to claim 10, wherein the outer peripheral surface of the second side plate includes a contact portion extending in a circular-arc shape as seen in the axial direction, the contact portion being in contact with the inner peripheral surface of the cylindrical portion, and a non-contact portion extending straight as seen in the axial direction, the non-contact portion being not in contact with the inner peripheral surface of the cylindrical portion.

12. The power transmission device according to claim 9, wherein the inertia member includes a screw hole extending in the axial direction.

13. The power transmission device according to claim 9, wherein the inertia member is made in a shape of an annulus extending in a circumferential direction, and the inertia member is larger in plate thickness than the first side plate.

14. The power transmission device according to claim 1, wherein the first side plate includes a first bulging portion bulging to the first side in the axial direction, and the inertia member is disposed radially outside the first bulging portion.

15. The power transmission device according to claim 14, wherein the torque limiter includes a second side plate disposed on the first side of the first side plate in the axial direction, the second side plate includes a second bulging portion bulging to a second side in the axial direction, the second bulging portion is in contact with the first bulging portion in the axial direction, and the inertia member is disposed radially outside the first and second bulging portions.

16. The power transmission device according to claim 1, wherein the inertia member includes a screw hole extending in the axial direction.

17. The power transmission device according to claim 1, wherein the inertia member is made in a shape of an annulus extending in a circumferential direction, and the inertia member is larger in plate thickness than the first side plate.

18. The power transmission device according to claim 1, wherein the inertia member is a nut with a thickness larger than a plate thickness of the first side plate.

19. The power transmission device according to claim 1, further comprising:

a damper unit, wherein the damper unit includes a first rotary member configured to be rotated unitarily with the friction plate, a second rotary member disposed to be rotatable relative to the first rotary member, and an elastic member elastically coupling the first and second rotary members therethrough to each other.

20. A torque limiter configured to be attached to a drive plate, the drive plate configured to receive a torque outputted from a prime mover, the torque limiter comprising:

a first side plate disposed on a first side of the drive plate in an axial direction, the first side plate configured to be rotated unitarily with the drive plate;

an inertia member disposed on the first side of the first side plate in the axial direction, the inertia member configured to be rotated unitarily with the first side plate;

a friction plate disposed to be rotatable relative to the first side plate;

a pressure plate holding the friction plate in cooperation with the first side plate, with the friction plate interposed therebetween; and an urging member urging the pressure plate toward the first side plate in the axial direction.

* * * * *